Patented Feb. 5, 1952

2,584,258

UNITED STATES PATENT OFFICE 2,584,258

PROCESSING OF GRAINS FOR THE PRODUCTION OF ALCOHOL

Leo M. Christensen, Lincoln, Nebr., and Leland A. Underkofler, Ames, Iowa

No Drawing. Application November 14, 1946, Serial No. 709,797

4 Claims. (Cl. 195—15)

This invention relates to the processing of grains for the production of alcohol, more particularly to the pretreatment of grains to remove constituents thereof which tend to reduce the ultimate yield of alcohol.

It has been observed, as is pointed out in U. S. Patent 2,348,451, that when grains are cooked at a reaction of about pH 1.8 to 2.0 unidentified substances are formed which may seriously inhibit or retard subsequent fermentation of the saccharified mash. In further investigation of this phenomenon it has been ascertained that such toxic or inhibitory substances are also formed or released when a grain mash is cooked at neutral reaction. The amount of such toxic or fermentation inhibiting substances which is released from corn is not great and the inhibitory effect is small; however when wheat, rye, barley and other small grains are utilized as the starchy material the effect upon ultimate alcohol yields is quite large and of definite economic significance.

While these inhibitory or toxic substances have not been isolated or identified it appears that they arise or are derived from some constituent of the seed coating or bran. Little is known of the character or the mode of action of these toxic substances. However, there is measurable evidence that one effect is a definite inhibition of amylase activity. As a result of this action the converse of starches to fermentable sugars is incomplete which is directly reflected in a commensurately diminished alcohol yield. Similarly, there is evidence that these substances are toxic to yeast in that they reduce the rate of multiplication and interfere with normal metabolism.

It has been determined that these toxic or inhibitory substances are thermolabile and may be inactivated by prolonged heating. This fact was established by a series of tests the results of which are given in the table. In these tests one part of ground wheat, 0.0005 part of barley malt and two parts of water were mixed at 55° C. and were heated to a temperature of 80° C. in 30 minutes. The mash was then cooked at a temperature of 115° C. for the different time periods shown in the table. At the termination of such cooking period the mash was immediately mixed with two parts of cold water containing, as a saccharifying agent 0.03 part of mold bran in accordance with the procedure set forth in U. S. Patent 2,342,330, so as to prevent retrogradation of the cooked starch. The saccharifying mash was held at optimum saccharification temperature for the period necessary to complete saccharification. The saccharified mash was then cooled to 30° C. inoculated with yeast and incubated during three days at 30° C. The alcohol yields listed in the table were measured by analysis of a distillate from the fermented mash and are expressed as proof gallons per 100 pounds of moisture-free total grain.

TABLE

*Influence of time of cooking upon the yield of alcohol from wheat*

| Time of Cooking, Minutes | Alcohol Yield—Proof gallons per 100 lbs. dry grain |
|---|---|
| 15 | 8.79 |
| 30 | 9.35 |
| 60 | 9.45 |

As is evident from the table a prolongation of the cooking time results in a definite increase in alcohol yield due to the thermal inactivation of the toxic substances. It is not desirable in commercial operations to cook mash for as long as an hour. With such a protracted cooking period caramelization occurs and the cost of operation becomes excessive. For these and other reasons it is desirable to develop some other method of inactivating the toxic material.

In further experimentation and study of this problem it was ascertained that these toxins of wheat and other grain brans are substantially completely destroyed when the bran is processed for mold bran production, as described in U. S. Patents 2,291,009; 2,352,168 and 2,325,368. It has been determined further that if as little as three pounds of bran be removed from 100 pounds of wheat, or other grains, and this bran is converted to mold bran and is then returned to the cooked mash as the source of amylases for saccharification, the toxin concentration is so reduced as to insure highly satisfactory yields.

This double benefit of removing the bran, processing it and returning it to the cycle at the saccharification stage will be evident from a consideration of a specific experimental operation. Wheat was milled to remove 3 pounds of bran per 100 pounds of wheat. The bran was then mixed with an equal weight of 0.1 N hydrochloric acid which contained the following nutrient salts in parts per million of dilute acid:

| | |
|---|---|
| Crystalline zinc sulfate | 0.625 |
| Crystalline ferrous sulfate | 0.625 |
| Crystalline copper sulfate | 0.080 |

This wet bran was sterilized by heating with steam at 100° C. for 20 minutes, it was then cooled, inoculated with spores of *Aspergillus oryzae* and incubated for a period of 36 hours while being aerated with humid sterile air.

The debranned wheat was mixed with two parts by weight of water and mashed, saccharified and fermented, as previously described, with a 15 minute cooking period and utilizing the mold bran prepared as described above as the source of amylases. The yield of alcohol was 9.65 proof gallons per 100 pounds of dry grain. This, as will be observed, is a substantially greater yield than was obtained even when using a 60 minute cooking cycle without the bran removed.

The invention therefore presents a marked double utility in that by removal and processing of the bran of the grain and returning it to the process as a source of amylases the deleterious effects of the toxins or inhibiting substances are eliminated and the bran itself is utilized as a beneficial adjuvant.

The preferred method of operation under the invention therefore comprises the debranning of the grain, preferably by dry methods, to remove three pounds or more of its bran content per 100 pounds of grain, the conversion of this bran to mold bran to build up a source of amylases while concomitantly inactivating or destroying the contained toxins, the mashing of the debranned grain utilizing mold bran prepared from the removed bran and the conversion of the saccharified mash to alcohol. As previously explained, it is highly desirable to quickly cool the cooked mash from cooking temperatures down to the optimum saccharification temperature of about 55° C. by direct mixing with cold water containing the mold bran saccharifying agent. This avoids the undesirable retrogradation of starch which obtains when the mash is slowly cooled. Such beneficial result may also be achieved by cooking at acid reaction, as explained in U. S. Patent 2,348,451.

The described process may be applied to any of the well-known grains with proper adjustment of milling equipment to insure the effective removal of the bran.

While preferred modifications of the invention have been described it is to be understood that these are given to exemplify the underlying principles involved and not as limiting the useful scope of the invention to the particular illustrative embodiments.

We claim:

1. A method of producing alcohol from grains chosen from the group consisting of wheat, rye and barley which comprises, removing bran from the grain to the extent of substantially 3 lbs. of bran per 100 lbs. of grain, inoculating the bran with spores of *Aspergillus oryzae* and incubating for a period of time sufficient to develop a mold bran of high amyloclastic activity; mashing the debranned grain, saccharifying the mash with the said mold bran and fermenting the saccharified mash to produce alcohol therefrom.

2. In the process of producing alcohol by the mashing, saccharification and fermenting of grains chosen from the group consisting of wheat, rye and barley that improvement which comprises, removing bran from the grain to the extent of substantially 3 pounds of bran per 100 pounds of grain inoculating the removed bran with spores of *Aspergillus oryzae*, processing such removed bran to develop mold bran therefrom and utilizing such mold bran as the saccharifying agent in the process.

3. A method of producing alcohol from grains chosen from the group consisting of wheat, rye and barley which comprises, dry milling the grain to remove the bran to the extent of at least 3 pounds of bran per 100 pounds of grain, inoculating the removed bran with spores of *Aspergillus oryzae* and incubating for a period of time sufficient to develop a high amylase content while inactivating the toxins of the bran, cooking the debranned grain, quickly cooling the cooked mash to a temperature of substantially 55° C. and saccharifying the cooled mash with the processed bran.

4. A method of producing alcohol from grains chosen from the group consisting of wheat, rye and barley which comprises, milling the grain to remove the bran to the extent of at least 3 pounds of bran per 100 pounds of grain, inoculating the removed bran with spores of *Aspergillus oryzae* and incubating for a period of time sufficient to develop a high amylase content while inactivating the toxins of the bran, cooking the debranned grain, quickly cooling the cooked mash down to optimum saccharifying temperature and saccharifying the mash with the processed bran in the proportion of substantially 3 pounds of mold bran per 100 pounds of grain in the mash.

LEO M. CHRISTENSEN.
LELAND A. UNDERKOFLER.

REFERENCES CITED

The following references are of record in the file of this patent:

UNITED STATES PATENTS

| Number | Name | Date |
|---|---|---|
| 254,329 | Jebb | Feb. 28, 1882 |
| 276,046 | Jebb | Apr. 17, 1883 |
| 2,342,330 | Christensen | Feb. 22, 1944 |
| 2,356,218 | Christensen | Aug. 22, 1944 |

FOREIGN PATENTS

| Number | Country | Date |
|---|---|---|
| 17,374 | Great Britain | of 1891 |

OTHER REFERENCES

Chem. Industries 53, pages 350–2 (1943), by Handren, abstracted in Chem. Abstracts, 1943 page 6813.